Patented July 29, 1941

2,251,220

UNITED STATES PATENT OFFICE 2,251,220

RUBBER CEMENT

Arthur W. Campbell, Terre Haute, Ind., assignor to Commercial Solvents Corporation, Terre Haute, Ind., a corporation of Maryland No Drawing. Application July 25, 1938, Serial No. 221,166

5 Claims. (Cl. 260—759)

My invention relates to improvements in adhesive cements and, more particularly, to heat vulcanizing rubber cements containing rubber in an organic solvent.

Rubber cements are largely used in industry as adhesives, for coating fabrics followed by drying and vulcanizing, and also for the manufacture of rubber articles by single or multiple dipping of molds or forms in the cement followed by the drying of each mold separately and vulcanizing the whole.

The simplest type of rubber cement consists of rubber dissolved in an organic solvent such as naphtha, gasoline, benzol, or carbon tetrachloride. Many other substances may be added to such cements, however, in order that desirable properties may be imparted to the cement. Certain rubber non-solvents such as alcohols, esters, ketones, sulfonated hydrocarbons, and the like, are often incorporated into rubber cements in order to reduce their viscosity and thereby permit, if desired, the incorporation therein of additional rubber. Fillers and softeners may also be added such as mineral oil, carbon black, clay and pigments. The heat vulcanizing cements also contain vulcanizing agents such as sulphur, selenium or tellurium, and accelerators such as diphenyl guanidine, polybutyraldehyde-aniline or zinc dibutyl dithiocarbamate and an activator such as zinc oxide or stearic acid.

It has been necessary in the past with the heat vulcanizing rubber cements to make them up in two different portions, one solution generally comprising rubber, solvent, zinc oxide, and the vulcanizing agent and the other comprising rubber, solvent, zinc oxide, and the accelerator. The two solutions are then mixed just before use. This is necessary since the complete rubber cement containing the vulcanizing agents and the accelerator tends to form irreversible gels, or vulcanize, after standing for a short time. Since the cement in this vulcanized gel form is not affected by the ordinary rubber solvents it is no longer utilizable as a cement and hence it has formerly been necessary either to make up only the amount of cement required for a particular job, or else discard the unused portion. This spontaneous vulcanization of the rubber cement at ordinary temperatures is entirely different from the gelling of non-vulcanizing cements. Cements of the latter type form reversible gels which may be dissolved by additional solvent or which may be inhibited by viscosity reducing agents such as acetone, ethyl alcohol, nitrobenzol, etc. These viscosity reducing agents have no beneficial effect with respect to inhibiting the irreversible gelling, or vulcanizing, of heat vulcanizing cements on storage at ordinary temperatures.

I have now discovered that the addition of nitroparaffins to heat vulcanizing rubber cements will inhibit irreversible gelling, or vulcanizing, at ordinary temperatures for considerable periods of time, and will permit the mixing of all of the components at the time of manufacture if unduly long storage periods are not anticipated. I have further discovered that the addition of these nitro compounds does not deleteriously affect the heat vulcanizing properties of the cement.

According to the present invention the complete rubber cement may be prepared in one solution and the nitro compound incorporated in any desired manner therein. The rubber stock may be prepared by incorporated the vulcanizing agent, the accelerator, the softener, and the filling material with the rubber, and the whole dissolved in some suitable solvent such as benzol, ethylene dichloride, or carbon tetrachloride. To this solution a suitable amount of the nitroparaffin may be added which is sufficient to prevent the cement from forming vulcanized gels on standing at ordinary temperatures, but not sufficient to cause precipitation of the rubber from the cement. It may be desirable in certain instances to add the nitroparaffin directly to the rubber solvent before dissolving the rubber therein.

For the specific examples to be used in illustrating my invention, the following rubber stock was prepared by mill mixing:

| | Parts by weight |
|---|---|
| Raw rubber | 100 |
| Ground sulfur | 60 |
| Dixie clay | 52 |
| Carbon black | 5 |
| Polybutyraldehyde-aniline accelerator | 2 |

A benzol cement was prepared by dissolving 250 parts by weight of the above rubber stock in 750 parts by weight of benzol (specific gravity 0.93) and 50 parts by weight of mineral oil were mixed into the resulting solution.

Example I

20% by volume of nitromethane was incorporated in the cement prepared as above. The resulting solution was allowed to stand in a sealed container at room temperature for a period of three months. The liquid had not gelled (vulcanized) at the end of this time. The viscosity of the solution at the time it was prepared was 8.7 and after standing was slightly reduced to 7.6. The viscosity measurements used are relative and refer to the number of seconds required for a perforated metal disc to fall under a constant head through a definite volume of solution contained in a standard cylinder. The control cement, which contained no nitroparaffin but to which was added 20% additional benzol, was firmly gelled (vulcanized) at the end of the three month period.

*Example II*

20% by volume of nitroethane was incorporated in the rubber cement described above. After storage in a sealed container for three months at room temperature the solution had not gelled (vulcanized). The viscosity of the solution was originally 20.8 and increased during standing to 28.6. The control cement had firmly gelled.

*Example III*

20% by volume of 1-nitroisobutane was added to the rubber cement described above. The viscosity of the resulting solution was 6.7. After the solution had stood at room temperature in a sealed container for a period of three months, the material was still liquid with a slightly reduced viscosity of 5.3. The control cement had firmly gelled.

I do not wish to limit myself to the nitro-paraffins indicated in the above examples since in the practice of my invention I have found that the nitroparaffins generally, and in particular the following, may also be used: 1-nitro-propane, 2-nitropropane, 1-nitrobutane, 2-nitrobutane, and phenyl-nitromethane. All of the nitroparaffins will inhibit gel formation when employed in accordance with the present invention, but I prefer to utilize the nitroparaffins containing from one to eight carbon atoms, and particularly the nitrobutanes, and phenyl-nitromethane. Mixtures of these nitro-compounds, such as are obtained by the direct nitration of the paraffin hydrocarbons, may likewise be utilized, as well as solutions of the nitroparaffins in other organic solvents, such as alcohols, ketones, esters, nitrobenzol, and the like, which are oftentimes incorporated in cements as viscosity reducers but which have no beneficial effect in inhibiting the formation of vulcanized gels. The choice of the particular nitroparaffin to be used will depend largely on the properties desired in the cement.

The amount of nitroparaffin to be employed in each individual case will depend on a number of factors such as, for example, the particular nitroparaffin utilized, the character of the rubber cement treated, the amount of rubber contained therein, etc. Since the nitroparaffins are not rubber solvents, they can be incorporated into cements only in amounts up to those somewhat less than are required to precipitate the rubber from the solution. The amount of nitroparaffin required to cause the precipitation of rubber from the cement will depend upon the concentration of the rubber in the cement, the composition of the solvent used, the concentration of the rubber, and in some instances, on other factors. Cements that have a tendency to form vulcanized gels in a relatively short time will, in general, require more nitroparaffin to stabilize the solution. In such instances, therefore, the permissible range of nitroparaffins which may be used to retard gelling and which at the same time will not cause precipitation of the rubber is considerably less than in the case of a cement containing less rubber and which will be in general more stable with respect to gelling on aging. The exact amount of nitroparaffin to be used in any particular rubber cement may be readily ascertained by determining the tolerance of a cement for the particular nitroparaffin which it is desired to use and by determining the time required to form a vulcanized gel, at elevated temperatures, of cements containing slightly less than the amount of nitroparaffin required to effect coagulation of the rubber in the cement. The tolerance values of benzol rubber cement solutions for different nitroparaffins, as determined by adding each nitroparaffin to a rubber cement of 10% initial rubber concentration, are shown in Table I, given below.

*Table I*

| Sample | Material | At coagulating point | |
|---|---|---|---|
| | | Rubber by vol. | Nitroparaffin by vol. |
| | | *Percent* | *Percent* |
| 1 | Nitromethane | 7.3 | 25.9 |
| 2 | Nitroethane | 5.9 | 41.0 |
| 3 | 1-nitropropane | 4.4 | 56.6 |
| 4 | 2-nitropropane | 4.8 | 52.3 |
| 5 | 1-nitroisobutane | 2.7 | 73.0 |
| 6 | 2-nitroisobutane | 3.4 | 66.2 |
| 7 | 1-nitro-n-butane | 2.4 | 76.3 |
| 8 | 2-nitro-n-butane | 2.5 | 75.3 |

In the above Table it will be seen that at the concentrations involved, the tolerance for nitroparaffins increases with increasing molecular weight but that the 2-nitroparaffins have in general a lower tolerance than the nitroparaffins of the more complex structures.

The results given in Table II, below, are for benzol cements to which were added nitroparaffins in amounts slightly less than required to precipitate the rubber. The cement utilized was a two-part cement of the formula:

| | Part I | Part II |
|---|---|---|
| Rubber | 100.0 | 100.0 |
| Zinc oxide | 0.5 | 0.5 |
| Sulfur | 2.0 | 0.0 |
| Zinc dibutyldithiocarbamate | 0.0 | 1.0 |

Each part was dissolved in benzol at 10% rubber concentration, the two parts of the cement were combined, and the nitroparaffins added to the complete cement. These samples were then placed in a water bath at 50° C. and the accelerated gelling time determined.

*Table II*

| Sample | Material | Rubber by vol. | Nitroparaffin by vol. | Gelling time |
|---|---|---|---|---|
| | | *Percent* | *Percent* | *Hours* |
| 1 | None | 10 | 0 | 4.5 |
| 2 | Nitromethane | 7.5 | 13 | 68.0 |
| 3 | Nitroethane | 6.25 | 23 | 56.0 |
| 4 | 1-nitropropane | 5.0 | 33.0 | 44.0 |
| 5 | 2-nitropropane | 5.5 | 28.5 | 32.0 |
| 6 | 1-nitro-n-butane | 3.0 | 55.6 | 120.0 |
| 7 | 2-nitro-n-butane | 3.0 | 55.6 | 192.0 |
| 8 | 1-nitroisobutane | 5.0 | 44.5 | 164.0 |
| 9 | 2-nitroisobutane | 4.0 | 42.8 | 44.0 |

The results given in Table III, below, are for benzol cements of the following composition:

|   | Part I | Part II |
|---|---|---|
| Rubber | 100.0 | 100.0 |
| Zinc oxide | 5.0 | 5.0 |
| Sulfur | 5.0 | 0.0 |
| Zinc dibutyldithiocarbamate | 0.0 | 1.0 |
| Polybutyraldehydeaniline accelerator | 0.0 | 1.0 |

Each part was dissolved in benzol at 10% rubber concentration, the two parts of the cement were combined, the nitroparaffin was introduced, and sufficient additional benzene was added to give a final rubber concentration of 5%. These samples were then placed in a water bath at 50° C., and the accelerated gelling time determined.

*Table III*

| Sample | Material | Nitroparaffin by volume | Gelling time |
|---|---|---|---|
|  |  | *Percent* | *Hours* |
| 1 | None | 0 | 22 |
| 2 | Phenyl-nitromethane | 1 | 146 |
| 3 | ——do—— | 5 | *432 |

*Test completed before jelling occurred.

I do not wish to be limited in any manner as to the specific ingredients that are incorporated within the rubber cement. For example, rubber may be used which has or has not been premasticated. The rubber solvent may be any that is satisfactory for the purpose, such as benzol, carbon tetrachloride, ethylene dichloride, etc. Fillers and softeners may be added such as carbon black, clay, pigments, mineral oil, etc. The vulcanizing agents, and accelerators may also be selected which are known to be useful for their purpose. I do not wish to be limited as to the manner in which the nitrocompound is to be incorporated into the cement. This may be done at any time during the process of manufacture or storage, but previous to the time when a vulcanized gel begins to form. If a long storage period is anticipated, the cement may be prepared in two parts, in accordance with previous practice, and the nitroparaffin may be incorporated in one or both parts.

This application is a continuation-in-part of my U. S. Ser. No. 145,786, filed June 1, 1937.

Having described my invention, what I claim is:

1. The improvement in the manufacture of heat vulcanizing rubber cements having solvents of the class consisting of aromatic hydrocarbons and chlorinated aliphatic hydrocarbons which comprises reducing the tendency of said cements to form vulcanized gels on standing at ordinary temperatures by incorporating therein a nitroparaffin containing from 1 to 8 carbon atoms in an amount sufficient to retard vulcanized gelling of the cement on standing and less than is required to precipitate rubber from the cement.

2. The improvement in the manufacture of heat vulcanizing benzol rubber cements which comprises reducing the tendency of said cements to form vulcanized gels on standing at ordinary temperatures by incorporating therein a nitroparaffin containing from 1 to 8 carbon atoms in an amount sufficient to retard vulcanized gelling of the cement on standing and less than is required to precipitate rubber from the cement.

3. The improvement in the manufacture of heat vulcanizing benzol rubber cements which comprises reducing the tendency of said cements to form vulcanized gels on standing at ordinary temperatures by incorporating therein phenyl-nitromethane in an amount sufficient to retard the vulcanized gelling of the cement on standing.

4. The improvement in the manufacture of heat vulcanizing benzol rubber cements which comprises reducing the tendency of said cements to form vulcanized gels on standing at ordinary temperatures by incorporating therein a nitrobutane in an amount sufficient to retard the vulcanized gelling of the cement on standing.

5. The improvement in the manufacture of heat vulcanizing benzol rubber cements which comprises reducing the tendency of said cements to form vulcanized gels on standing at ordinary temperatures by incorporating therein 1-nitroisobutane in an amount sufficient to retard the vulcanized gelling of the cement on standing.

ARTHUR W. CAMPBELL.